(12) United States Patent
Franca-Neto

(10) Patent No.: US 7,383,058 B2
(45) Date of Patent: Jun. 3, 2008

(54) RF/MICROWAVE SYSTEM WITH A SYSTEM ON A CHIP PACKAGE OR THE LIKE

(75) Inventor: Luiz M. Franca-Neto, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 484 days.

(21) Appl. No.: 10/196,091

(22) Filed: Jul. 16, 2002

(65) Prior Publication Data

US 2004/0014428 A1 Jan. 22, 2004

(51) Int. Cl.
*H04M 1/00* (2006.01)
(52) U.S. Cl. .................. 455/550.1; 455/333; 455/90.3; 257/98; 257/99
(58) Field of Classification Search ................ 455/333, 455/66.1, 90.3, 556.1, 557, 344, 78, 550.1, 455/552.1; 257/74, 84, 98, 114, 278, 99, 257/777; 361/718, 764; 370/478, 468; 340/635; 333/126
See application file for complete search history.

(56) References Cited

U.S. PATENT DOCUMENTS

| | | | | |
|---|---|---|---|---|
| 4,661,997 A * | 4/1987 | Roberts et al. | ............. | 455/327 |
| 5,939,753 A * | 8/1999 | Ma et al. | ............. | 257/339 |
| 6,075,995 A * | 6/2000 | Jensen | ............. | 455/552.1 |
| 6,150,724 A * | 11/2000 | Wenzel et al. | ............. | 257/777 |
| 6,542,720 B1 * | 4/2003 | Tandy | ............. | 455/90.3 |
| 6,570,880 B1 * | 5/2003 | Coden | ............. | 370/404 |
| 6,582,978 B2 * | 6/2003 | Shiraishi | ............. | 438/16 |
| 6,882,546 B2 * | 4/2005 | Miller | ............. | 361/783 |
| 7,057,518 B2 * | 6/2006 | Schmidt | ............. | 340/635 |
| 2002/0098802 A1 * | 7/2002 | Karabinis | ............. | 455/13.1 |
| 2002/0180032 A1 * | 12/2002 | Sun et al. | ............. | 257/704 |
| 2002/0187804 A1 * | 12/2002 | Narasimha et al. | ......... | 455/552 |
| 2002/0196085 A1 * | 12/2002 | Nakamata et al. | .......... | 330/302 |
| 2003/0005316 A1 * | 1/2003 | Girard | ............. | 713/193 |
| 2003/0057429 A1 * | 3/2003 | Schmidt | ............. | 257/99 |
| 2003/0060185 A1 * | 3/2003 | Fisher et al. | ............. | 455/344 |
| 2003/0219035 A1 * | 11/2003 | Schmidt | ............. | 370/478 |

OTHER PUBLICATIONS

L.M. Franca-Neto et al., Enabling High-Performance Mixed-Signal System-on-a-Chip (SoC) in a High Performance Logic CMOS Technology, Intel Corporation, 4 pps., Jul. 2002.
L.M. Franca-Neto, "System-on-a-package (SoP) Solution for High Performance RF/Microwave Systems", Wireless Technology Lab; Intel Corporation, 1 page, Jul. 2002.

* cited by examiner

*Primary Examiner*—Danh Le
(74) *Attorney, Agent, or Firm*—Schwabe, Williamson & Wyatt, P.C.

(57) ABSTRACT

A transceiver system on a single package provides an RF/Microwave subsystem in an area external to the processor die which contains a digital processor. The external area may include an antenna-switch, an input matching network and an impedance transformer impedance transformer and RF-choke for a power amplifier as the passive elements to provide both lower noise reception and higher efficiency transmission.

10 Claims, 7 Drawing Sheets

RF/MICROWAVE SYSTEM WITH A SYSTEM ON A CHIP PACKAGE OR THE LIKE

BACKGROUND OF THE INVENTION

Radio-Frequency (RF) and microwave front-end integration with higher-performance digital processors is becoming possible by utilizing ever more complex CMOS technology system integration. Available on-die isolation plus judicious layout and circuit techniques enable the integration of delicate RF/Microwave front ends in a hostile digital environment. Nevertheless, isolation problems generally call for fixed, higher performance passive components in order to provide a non-compromising RF/Microwave subsystem performance for wireless communications. These higher quality components are generally not available on-die and are provided external to the system package. The antenna-switch, the input matching network and the impedance transformer and RF-choke for the transmitter power amplifier are the passive elements of a transceiver system.

DESCRIPTION OF THE DRAWING FIGURES

The numerous aspects of the present invention may be better understood by those skilled in the art by reference to the accompanying figures in which.

DETAILED DESCRIPTION

Figure 1A:
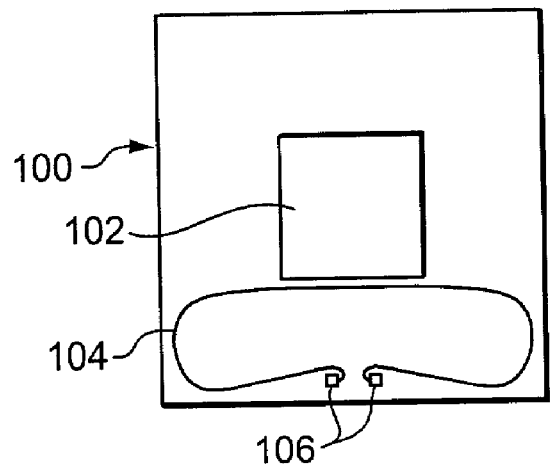
FIG. 1A is a diagrammatic illustration of an RF/microwave system disposed on a single package in accordance with the present invention.
Figure 1B:
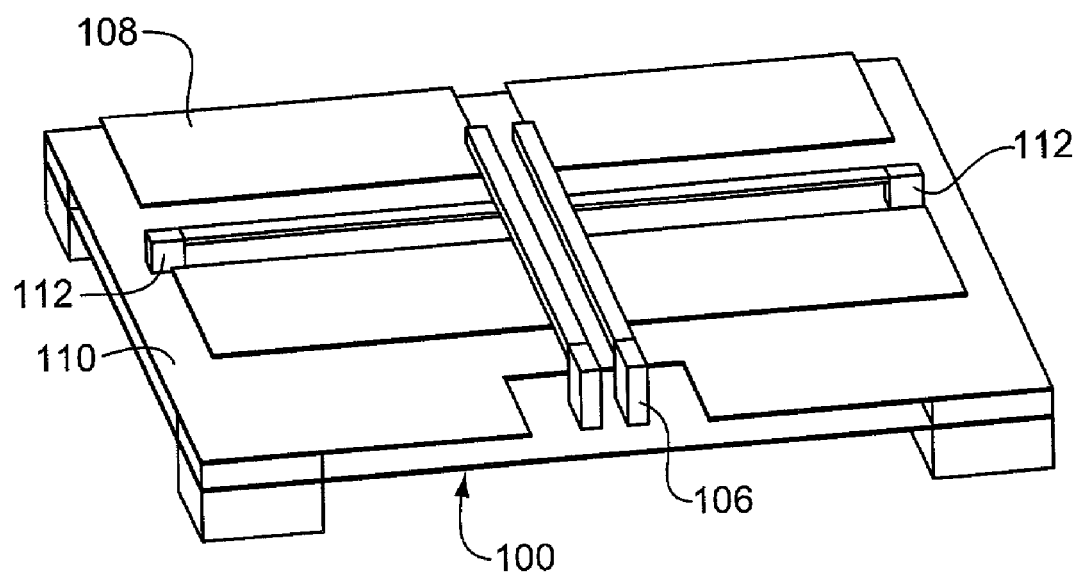
FIG. 1B is an isometric diagram of an antenna disposed on a flip-chip package such as that shown in FIG. 1A.

Referring now to FIG. 1A, a diagrammatic illustration of an RF/microwave subsystem disposed on a single chip in accordance with a particular embodiment of the present invention will be discussed. A chip package 100 is shown in FIG. 1A as including a die 102 disposed centrally thereon. Package 100 may be a multilayer package in one embodiment of the invention. An area 104 disposed on flip-chip package 100 external to die 102 may be available for providing passive RF/microwave components thereon in accordance with the present invention. As shown in FIG. 1A, antenna contacts 106 may be provided to couple with the components disposed in area 104 to an antenna 108 as shown in FIG. 1B. Package 100 may be utilized, for example, in higher-performance digital processors, although the scope of the present invention is not limited in this respect. In one particular embodiment of the invention, package 100 is a flip-chip package, however the invention may encompass various other types of chip packages as well without departing from the scope of the invention and without providing substantial change thereto, although the scope of the invention is not limited in this respect.

Referring now to FIG. 1B, an antenna disposed on a chip package such as that shown in FIG. 1A will be discussed. Antenna 108 may be for example a 5.2 GHz antenna disposed on a heat-spreader 110 of a flip-chip package 100 as shown in FIG. 1A to provide a system-on-a-package solution for a device such as a handheld computer, cell phone, or the like. A system-on-a-package solution may include but not be limited to a single chip package that includes a general purpose processor in combination with a wireless system such as a transceiver and other radio-frequency (RF) and/or microwave components. Heat-spreader 110 may be supported on package 100 by one or more mechanical supports 112. The area occupied by heat-spreader 110 however is not limited by the area of package 100 and is not limited to any particular size. For example, a larger form factor structure to accommodate a 2.4 GHz Industrial, Scientific, and Military (ISM) band and omnidirectional radiation may be provided in one particular embodiment. Alternatively, the antenna structure may be placed at a distance, having its structure still connected to the top of the package thus reducing the risk that RF/microwave signals travel through vias, pins, or traces on a motherboard on which the system-on-a-package may be disposed, although the scope of the invention is not limited in this respect.

Figure 2A:
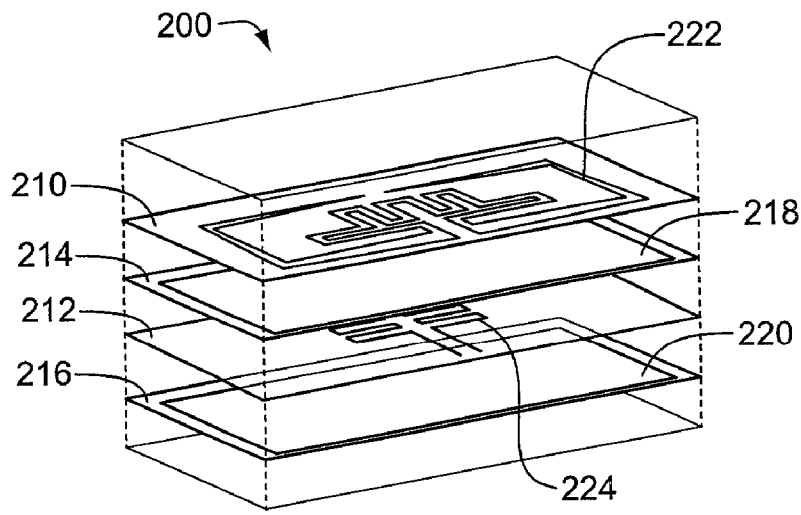
FIG. 2 is an exploded view of a multi-layer differential antenna switch in accordance with the present invention.
Figure 2B:
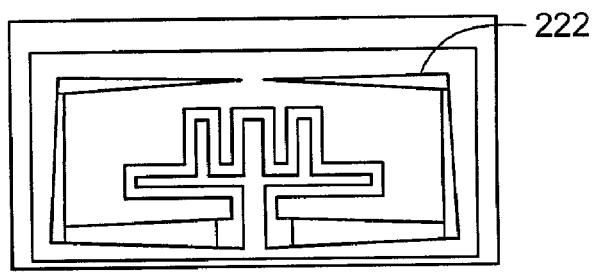
Figure 2C:
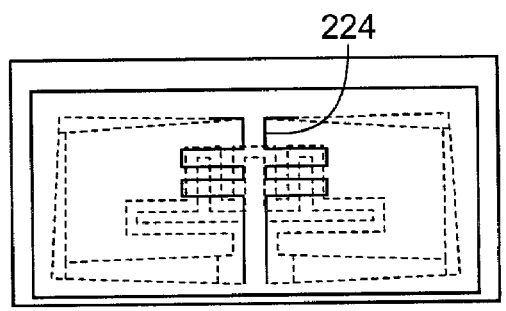

Referring now to FIG. 2, including FIGS. 2A, 2B, and 2C, an exploded view of a multi-layer differential antenna switch will be discussed. In one embodiment of the invention, FIG. 2A shows an exploded 3D view of a multi-layer differential antenna switch for a 2.4 GHz ISM radio as an example. FIG. 2B shows a tapered-line impedance transformer and RF choke 222 for a transmitter power amplifier. FIG. 2C shows a quarter wavelength stripline for connection to a receiver. The components shown in FIGS. 2, 2A, 2B, and 2C may be disposed on area 104 of package 100 as shown in and discussed with respect to FIG. 1A, although the scope of the invention is not limited in this respect.

As shown in FIG. 2A, antenna switch 200 in one embodiment includes two metal layers 210 and 212 with traces, and two metal layers 214 and 216 with ground planes 218 and 220. An impedance transformer and RF choke 222 of a power amplifier (not shown) may be disposed on the top metal layer 210 of package 100 and may include a tapered microstrip structure as shown in FIG. 2B. A quarter-wavelength stripline 224 may connect an antenna, for example antenna 314 of FIG. 3, to a low noise amplifier (LNA), for example LNA 410 of FIG. 4, and may be provided between ground planes 218 and 220. In one particular embodiment, quarter-wavelength stripline 224 has an impedance of 50 ohms. The example antenna switch 200 illustrates one embodiment for a 2.4 GHz ISM band radio. Radios that operate at higher frequencies may imply smaller form factors and radios that operate at lower frequencies may imply larger form factors, both of which may be accommodated by the present invention. Switch 200 may be better understood using electrical circuit diagrams for the transmission line structures including transformer and RF choke 222 and quarter-wavelength stripline 224 on package 100 as shown in and described with respect to FIGS. 3, 4, and 5, although the scope of the invention is not limited in this respect.

Figure 3:
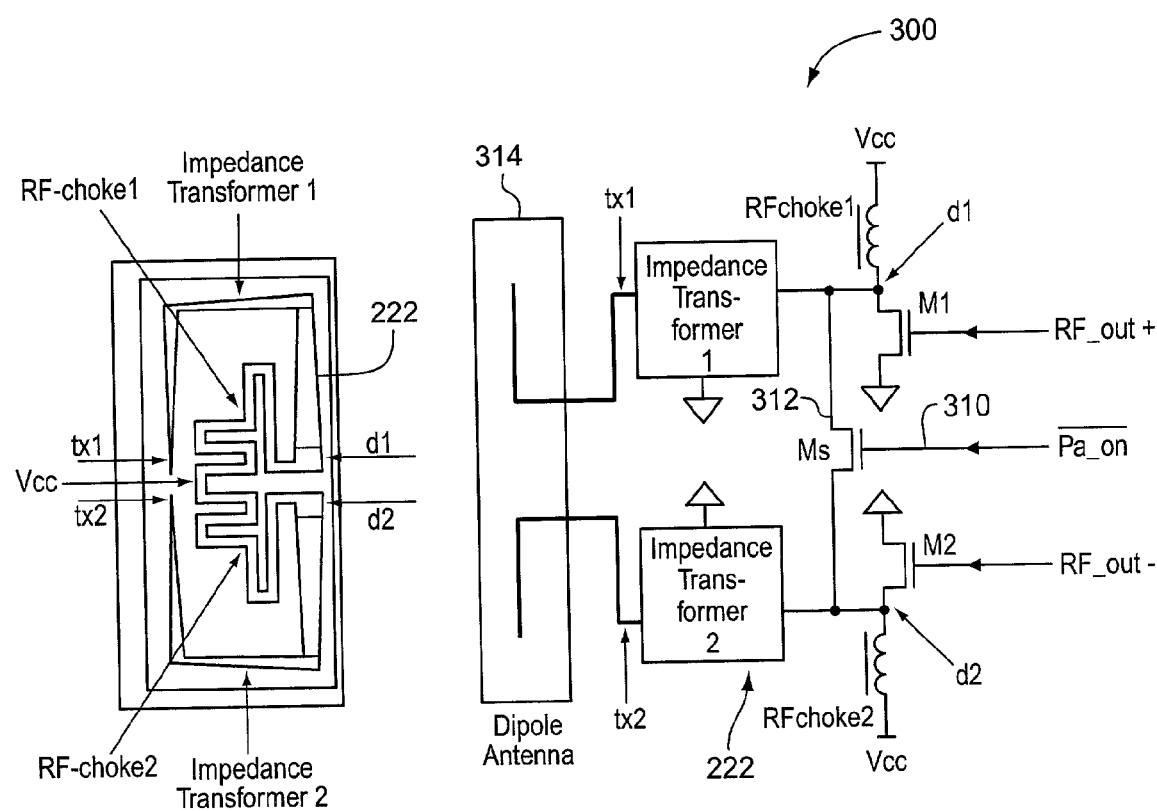
FIG. 3 is a physical trace illustration and a corresponding circuit diagram illustration of a transmitter power amplifier front end of a transceiver in accordance with the present invention.
Figure 4:
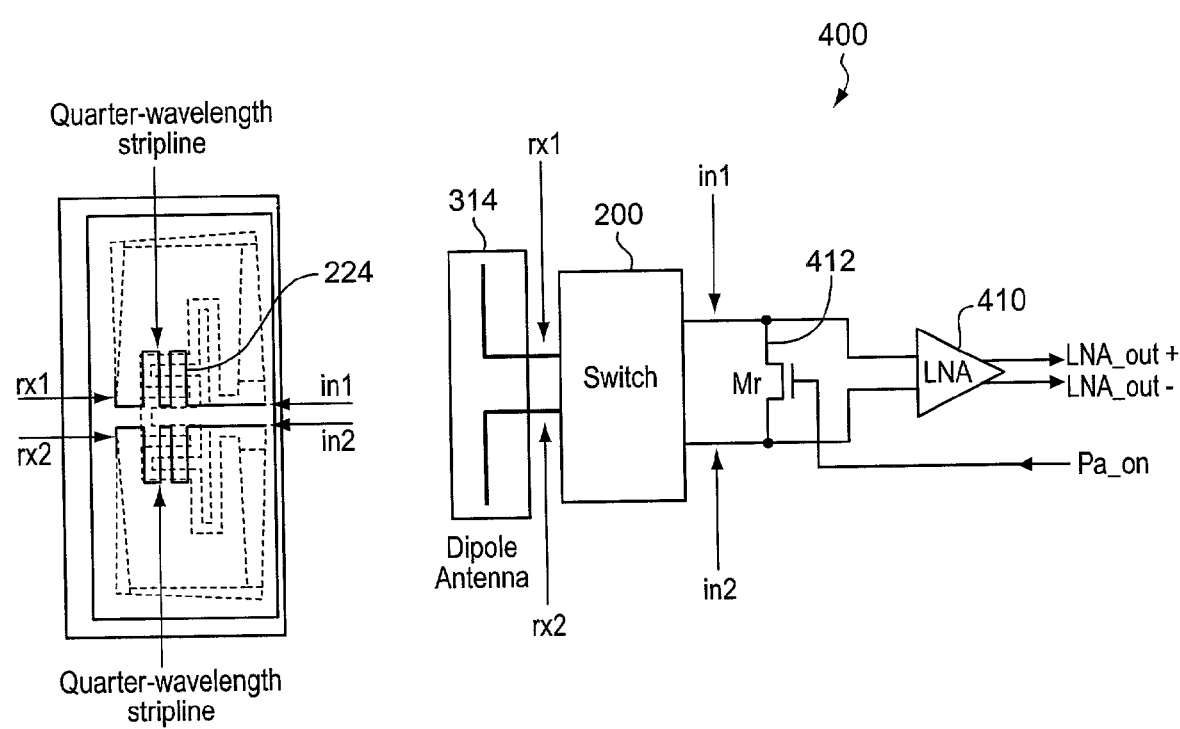
FIG. 4 is a physical trace illustration and a corresponding circuit diagram a receiver end of a transceiver circuit in accordance with the present invention.

Referring now to FIG. 3, a transmitter power amplifier front end of a transceiver in accordance with the present invention will be discussed. FIG. 3 depicts a transmitter power amplifier (PA) front-end, transmitter circuitry 300, with the metal layer components being shown on the left and a representative circuit and accompanying circuitry being shown on the right. When a transceiver utilized with the present invention is in receiving mode, voltage Pa_on 310="0", transistor Ms 312 which uses the inverted Pa_on signal shorts nodes d1 and d2. Since tapered microstrip line 224 of FIG. 2 has one-quarter wavelength length, a higher impedance relative to 50 ohms in this embodiment may be provided at nodes tx1 and tx2, thereby reducing the effect on the receiver circuitry by the presence of the transmitter circuitry as shown in FIG. 4. Analogously, when the transceiver is in transmitting mode (e.g., voltage Pa_on 310="1"), a switching transistor, transistor Mr in the receiver circuitry 400 shown in FIG. 4 in the receiving-end may reduce the effect of receiver circuitry 400 on transmitter circuitry 300, although the scope of the invention is not limited in this respect.

In one embodiment of the invention, tapered microstrip line 224 may transform the impedance, in this example 50 ohms, from antenna 314 into a resistance value approximately equal to 1.5 ohms, a quarter of wavelength distance away from the antenna, at nodes d1 and d2. Tapering the line may allow for both higher bandwidth operation of the impedance transformer and to ensure the higher impedance posed at nodes tx1 and tx2 when the transceiver is in receiving mode is a higher impedance with respect to 50 ohms rather than with respect to the lower 1.5 ohms. In one embodiment of the invention, switch 200 may operate in such a manner so as to render the transmitter circuitry 300 invisible to the receiver circuitry 400 when the transceiver is in a receiving mode. Such an impedance transformation optionally enables the power amplifier of transmitter circuitry 300 to deliver higher RF power to antenna 314 under lower voltage power supply lines. In one embodiment of the invention, the RF-chokes in the schematic offer a higher impedance at RF/microwave frequencies and may be realized in a particular embodiment by one-quarter wavelength highly twisted and compacted 50 ohms transmission lines placed in the area surrounded by the tapered transmission lines, which have their extreme ac-grounded at the Vcc node by the virtual ground produced by differential operation of the transceiver. The Vcc node is placed in the symmetry axis along the differential power amplifier lines so that an ac-short, or virtual ground, is reinforced at this node without requiring a larger valued capacitor, although the scope of the invention is not limited in this respect.

Refering now to FIG. 4, a receiver end of a transceiver circuit in accordance with an embodiment of the present invention will be discussed. Stripline 224 is coupled with receiver circuitry 400 and consists of a trace sandwiched between two ground planes 218 and 220, and in one embodiment a 50 ohms transmission line may be provided using finer traces. Such a configuration allows for denser serpentine which may allow for quarter wavelength transmission lines to be disposed in a relatively smaller area. A relatively smaller area may be utilized with the typically lower power RF signals dealt with in receiver circuitry 400, and for compact realization of an input matching network on package 100. During reception, quarter wavelength stripline 224 conveys a signal from antenna 314 to the low noise amplifier (LNA) 410 with little or no electrical attenuation. During transmission operation of the transceiver, quarter wavelength stripline 224 may be ac-shorted by transistor Mr 412 at nodes in1 and in2, thus providing a higher impedance at nodes rx1 and rx2, thereby reducing the effect of receiver circuitry 400 on transmitting circuitry 300, although the scope of the invention is not limited in this respect.

Figure 5:
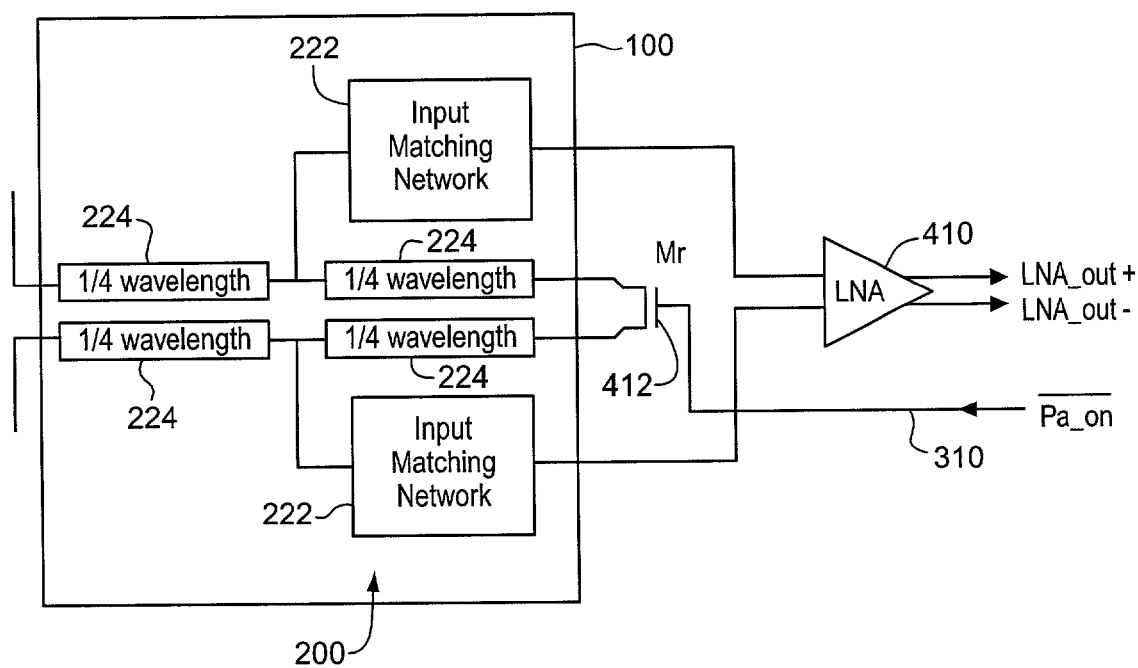
FIG. 5 is a circuit diagram of an alternative embodiment of antenna switch in accordance with the present invention.

Referring now to FIG. 5, an alternative embodiment of antenna switch 200 will be discussed. Since a higher quality passive input matching network may be utilized in the design of higher sensitivity receivers, FIG. 5 depicts how one such embodiment of input matching network 222 may be implemented on package 100. Two additional quarter wavelength striplines 224 may be added to preserve the functionality of antenna switch 200. Since transistor Mr 412 is a full wavelength away from the antenna nodes in the embodiment shown in FIG. 5, operation of transistor Mr 412 is activated by voltage Pa_on 310="0" rather than Pa_on 310="1", and the transmission part of switch 200 remains operating as discussed with respect to FIGS. 3 and 4, although the scope of the invention is not limited in this respect.

In an alternative embodiment of the invention, a multi-band radio solution may be provided by a straightforward extension of the concept of the invention as discussed herein. For example, radio transceivers at various ISM bands may have their passive components disposed at the other sides of the surface of the square flip-chip package 100 of FIG. 1A surrounding the die, and the antenna structure on the heat spreader may be featured as multiple independent radiators operating independently at the ISM bands, although the scope of the invention is not limited in this respect.

In one embodiment, whole shielding may be used to reduce the amount of unintended signals that radiate from the handheld, for example being slotted by design to make the system on package 100 a multi-band "slot" radiator. Moreover, in further alternative embodiments, a single band radio may have several connections to such an antenna structure so that beam steering and receiving antenna diversity also may be implemented in the system-on-a-package on package 100. Beam steering may be utilized to provide lower power operation by not wasting signal in unintended directions but rather by aiming the beam to the intended receiver, and may co-existence at same or multiple frequencies. Moreover, if a higher transmitted output power is desired, the power amplifier transistor on die and other passive elements on the package may be duplicated so that their combined power is added to the antenna terminals. Such an embodiment may be accommodated by using other layers of the multi-layer flip-chip package for the traces of the duplicated power amplifier, although the scope of the invention is not limited in this respect.

Figure 6:
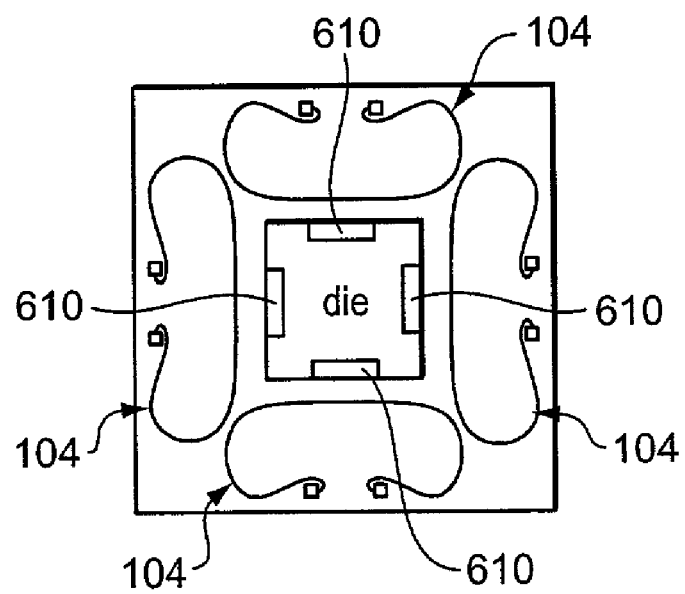
FIG. 6 is a diagrammatic illustration of a multiple RF/microwave system-on-a-package in accordance with the present invention.

Referring now to FIG. 6, a diagram of a multiple system-on-a-package in accordance with an embodiment of the present invention will be discussed. In one embodiment of the invention, FIG. 6 shows an extension of a system-on-a-package concept of package 100 towards a multi-band radio transceiver implementation, where multiple antenna switches and passive components may be implemented on the multilayer flipped-chip package 100 at corresponding multiple areas 104 on package 100. In one embodiment, transceivers in area 104 may operate without being affected by the presence of the other transceivers of the corresponding other areas. In such an embodiment, the transceivers' front-ends disposed in areas 104 may have a corresponding on-die asynchronous communication processor 610. Thus, areas 104 may contain antenna contacts and RF/microwave components for an independent radio band or frequency, each having a corresponding communication processor 610 on die 10 and may further include memory components, for example random access memory (RAM) 710, although the scope of the invention is not limited in this respect.

Figure 7:
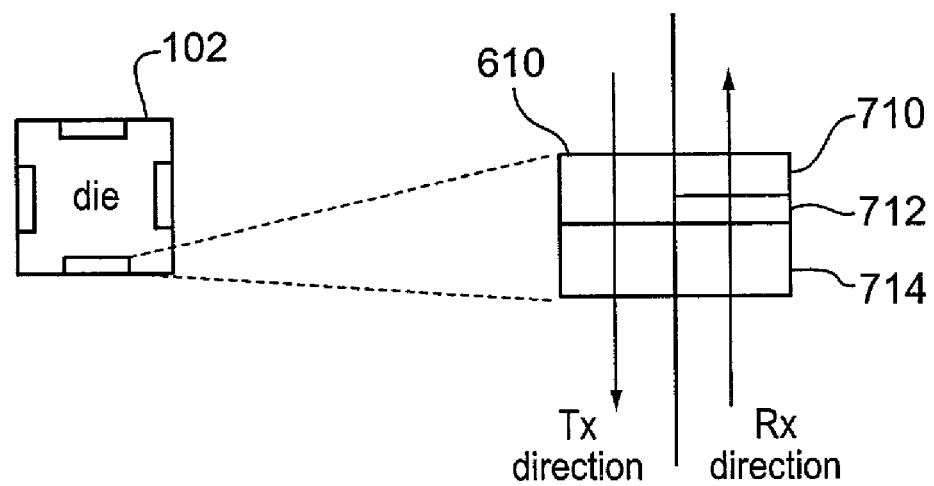
FIG. 7 is a diagram of an on die software-hardware partition for a communication processor in accordance with the present invention.

Referring now to FIG. 7, an embodiment of an on die software-hardware partition in a communication processor in accordance with an embodiment of the present invention will be discussed. Physical layer operations such as the RF/microwave front-end, receiver diversity, modulation, demodulation and detection, may be handled by physical layer circuitry 714. Parallel hardware may be utilized to allow the border between continuous and discrete time signal processing to be implemented for bit-rates reaching 100 Mb/s in one embodiment. Media access control (MAC) layer operations may be handled by a general purpose digital processor residing on the same die 102, although the scope of the invention is not limited in this respect.

In one embodiment of the invention, a transceiver implemented on package 100 in accordance with the present invention may operate at a lower power level. Such a lower power level may be provided by the addition of a sublayer 712 for received packet identification in the receiving direction one or more of the transceivers as indicated in FIG. 7. Sub-layer 712 may operate to discard one or more or all the packets not intended to its assigned client communications processor 610. Such an arrangement allows for powering down the larger general purpose digital processor in die 102 and only wakening up the digital processor when a packet intended to be directed to it arrives, although the scope of the invention is not limited in this respect.

In yet further embodiment of the invention, allocation of programmability where needed or desired may be provided. An individual communication processor 610 may be configured by software to implement a specific modulation/demodulation scheme or schemes, which may be performed by writing specific codes at assigned addresses on the RAM companion to the corresponding communication processor 610. MAC operations, being network protocol oriented, may provide programmability flexibility under the general purpose microprocessor on die 102. RAM 710 may be provided at one or more of the communication processors 610, either outside or on die, for example to serve as a buffer for streaming in or out packets, and to allow for multi-tasking on the general purpose processor, although the scope of the invention is not limited in this respect.

Thus, in one embodiment of the invention, one or more transceivers may be provided on package 100 each being designed to operate at a particular frequency or frequencies to that a desired frequency band of operation for package 100 may be selected by selecting on or more appropriate transceivers. Furthermore, each of the transceivers may be individually programmed to operate at one or more frequencies or modulation schemes, providing a further layer of programmability. This allows a single package 100 to provide multiple radio solutions that may be flexibly altered or reprogrammed as desired, although the scope of the invention is not limited in this respect.

Figure 8:
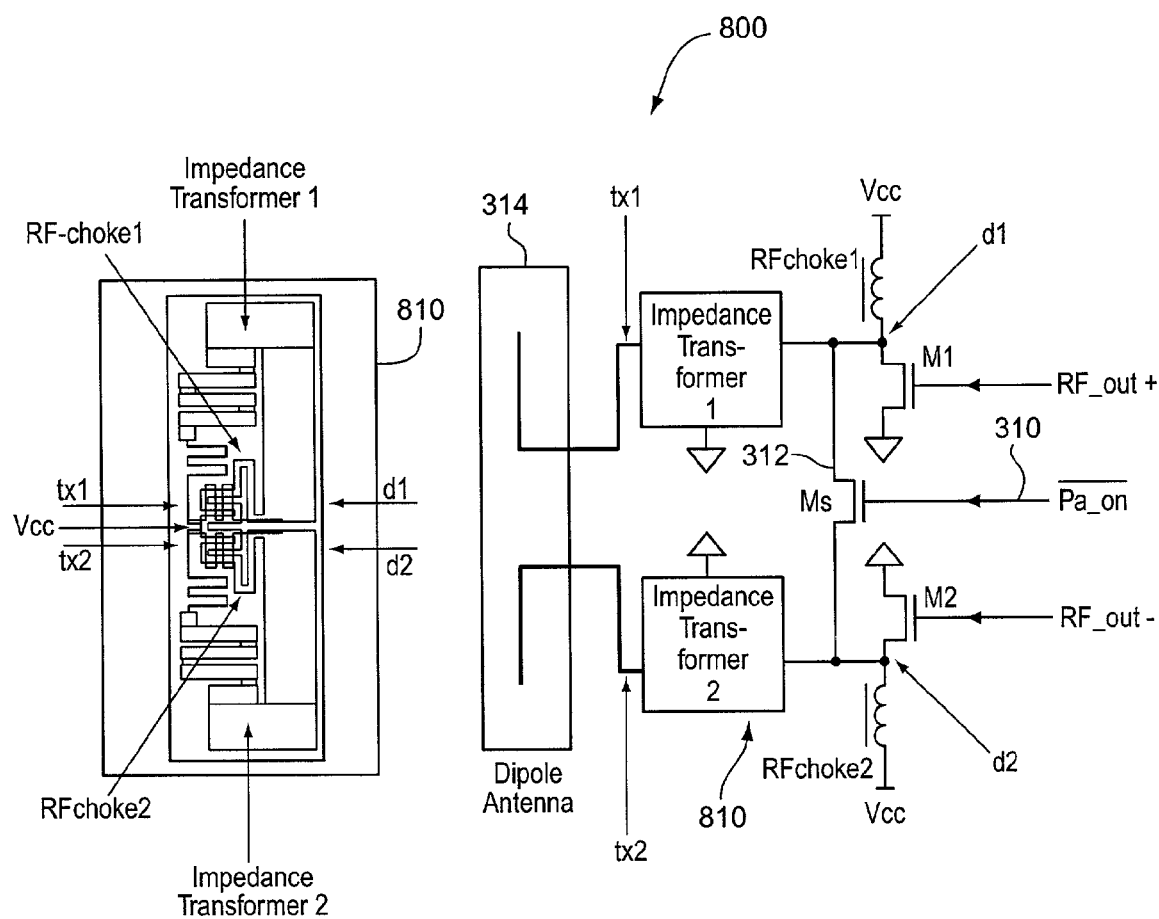
FIG. 8 is a circuit diagram of an alternative embodiment of antenna switch where the power amplifier impedance transformer is implemented with a 3-step tapered transmission line.

Referring now to FIG. 8, a circuit diagram of an alternative embodiment of antenna switch where the power amplifier impedance transformer is implemented with a 3-step tapered transmission line will be discussed. The operation of transmitter circuitry 800 in FIG. 8 is similar to the operation of transmitter circuitry 300 of FIG. 3, with the metal layer components being shown on the left and an equivalent circuit and accompanying circuitry being shown on the right. Tapered-line impedance transformer and RF choke 810 corresponds to tapered-line impedance transformer and RF choke 222 of FIG. 3, a difference being that tapered-line impedance transformer and RF choke 810 utilizes a 3-step tapered line for the power amplifier impedance transformation. In one embodiment, tapered-line impedance transformer and RF choke 810 comprises two RF chokes, RF-choke 1 and RF-choke 2, made of quarter wavelength microstrips, with Vcc supply placed at symmetry axis (ac ground), thus producing higher impedances and nodes d1 and d2. Impedance transformers, Impedance Transformer 1 and Impedance Transformer 2, may be tapered three-quarter wavelength microstrips to convert an impedance of antenna 314 from 50 ohms into 1.5 to 2.0 ohms. Transistor Ms 312 may short the differential lines to produce a higher impedance at the terminals of antenna 314 during reception, although the scope of the invention is not limited in this respect.

Although the invention has been described with a certain degree of particularity, it should be recognized that elements thereof may be altered by persons skilled in the art without departing from the spirit and scope of the invention. It is believed that the RF/microwave system for system on a chip package or the like of the present invention and many of its attendant features will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. An apparatus comprising:
    a multi-layered chip package having a plurality of tranceiver front ends disposed in the chip package, each of the plurality of transceiver front ends having passive components including a radio-frequency choke and an impedance transformer with a tapered microstrip structure implemented on a plurality of layers of the multi-layered chip package;
    a die disposed on said multi-layered chip package and having a plurality of communication processors, each of the plurality of communication processors coupled to a respective transceiver front end of the plurality of tranceiver front-ends disposed in the multi-layered chip package; and
    a circuit board having the multi-layered chip package disposed thereon.

2. An apparatus as claimed in claim 1, at least one of the plurality of communication processors including physical layer circuitry for implementing a modulation or a demodulation scheme.

3. An apparatus as claimed in claim 1, at least one of the plurality of communication processors including a memory layer to interface with a general purpose processor disposed on said die.

4. An apparatus as claimed in claim 1, at least one of the plurality of communication processors including a sublayer for identifying whether a packet is intended for the corresponding communications processor.

5. An apparatus as claimed in claim 1, a first communication processor of the plurality of communication processors including a sublayer for identifying whether a packet is intended for the first communication processor, said first communication processor to operate in a lower power mode by being powered down until said sublayer identifies a packet intended for the first communication processor.

6. An apparatus as claimed in claim 1, said chip package being a flip-chip package.

7. An apparatus as claimed in claim 1, further comprising an antenna to couple with each of the plurality of transceiver front-ends.

8. An apparatus as claimed in claim 1, at least one of the plurality of transceiver front-ends comprising at least one or more elements selected from the group consisting essentially of a switch, an impedance transformer, and an RF-choke.

9. An apparatus as claimed in claim 1, comprising an antenna to couple with at least one of the plurality of transceiver front-ends and being disposed on a heat spreader coupled to said chip package.

10. An apparatus as claimed in claim 1, wherein the chip package is a multi-layered chip package and the plurality of transceiver front-ends are disposed on one or more layers of the multi-layered chip package.

* * * * *